United States Patent
Xu et al.

(10) Patent No.: US 7,734,681 B2
(45) Date of Patent: Jun. 8, 2010

(54) INTER-PROCESS MESSAGING USING MULTIPLE CLIENT-SERVER PAIRS

(75) Inventors: Ming Xu, San Ramon, CA (US); Phuong Thao Trung Le, San Jose, CA (US)

(73) Assignee: Symantec Operating Corporation, Mountain View, CA (US)

( * ) Notice: Subject to any disclaimer, the term of this patent is extended or adjusted under 35 U.S.C. 154(b) by 2342 days.

(21) Appl. No.: 10/223,976

(22) Filed: Aug. 20, 2002

(65) Prior Publication Data

US 2004/0039774 A1    Feb. 26, 2004

(51) Int. Cl.
*G06F 15/16* (2006.01)
(52) U.S. Cl. .................................... 709/203; 709/248
(58) Field of Classification Search ................ 709/230, 709/201, 203
See application file for complete search history.

(56) References Cited

U.S. PATENT DOCUMENTS 5,689,550 A * 11/1997 Garson et al. ............ 379/88.18
6,141,720 A    10/2000 Jeffords et al.
6,424,872 B1 *  7/2002 Glanzer et al. ................ 700/18
2003/0097448 A1 *  5/2003 Menezes et al. ............. 709/227

OTHER PUBLICATIONS

"Transmission Control Protocol," DARPA Internet Program Protocol Specification; Prepared for Defense Advanced Research Projects Agency by Information Sciences Institute, University of Southern California, Marina del Ray; Sep. 1981; pp. 1-85.

* cited by examiner

*Primary Examiner*—Karen C Tang
(74) *Attorney, Agent, or Firm*—Meyertons, Hood, Kivlin, Kowert & Goetzel, P.C.

(57) ABSTRACT

A plurality of virtual circuits, each including at least two network nodes, may be established over a single network connection for inter-process messaging. The network connection may be opened asynchronously via a non-blocking open. A virtual circuit including three or more nodes may be implemented in a star formation or a relay formation. Messages may be sent as unicast or broadcast messages. An additional virtual circuit may be opened for the purpose of transmitting status information regarding the network connection between the networked computer systems.

24 Claims, 11 Drawing Sheets

INTER-PROCESS MESSAGING USING MULTIPLE CLIENT-SERVER PAIRS

BACKGROUND

1. Field of the Invention

This invention is related to the field of networked computer systems and, more particularly, to techniques for inter-process messaging.

2. Description of the Related Art

Companies today rely to an unprecedented extent on online, frequently accessed, constantly changing data to run their businesses. Unplanned events that inhibit the availability of this data can seriously damage business operations. In addition, any permanent data loss, from disaster or any other source, will likely have serious negative consequences for the continued viability of a business. Therefore, when disaster strikes, companies must be prepared to eliminate or minimize data loss and recover quickly with usable data.

Even with the most well-executed backup strategy, restoring from tape usually results in several hours of lost data. For many environments, this kind of data loss is unacceptable and real-time replication is an essential technique. Real-time replication not only minimizes or eliminates data loss, but also enables rapid recovery when compared to conventional bulk data transfer from sequential media. The replica data is available and ready for use on disk at a disaster-safe location.

A successful replication solution would allow operations to continue without a significant break in continuity. To keep the recovery data removed from the impact of a disastrous event, it should be stored in a different geographical location from the primary data. Depending on business requirements, this could be across campus, across town, or across continents. In addition to having data at a disaster-safe location, the ideal replication solution would ensure that the replica volumes are current (fully up-to-date), complete (including all applications, logs, configuration data, etc.), and recoverable (consistent data that is free from errors).

In a distributed environment, replication as well as other management tasks may require substantial messaging traffic across the network. Messages between and among hosts may be used to ensure that data is up-to-date, that logs are properly maintained, that configuration data is exchanged, and for other suitable purposes. Of course, inter-process messaging requires the opening and use of network connections (often using TCP/IP protocols) between nodes on the network. Substantial overhead may be incurred in opening, using, and maintaining these network connections. For example, long delays may be encountered when opening TCP/IP connections over a wide-area network (WAN) with high latency, such as a network having nodes separated by hundreds or thousands of miles. Furthermore, most systems place restrictions on the number of concurrent network connections that are accessible by a particular host or by a process executing on a host. When high security is desired, the opening of a secure connection (e.g., a secure socket layer [SSL] handshake) may cause further delays. Additional overhead may be incurred in the maintenance of network connection status, such as by using ICMP ping operations to provide a "heartbeat."

In a distributed management framework where multiple software objects may exist across multiple hosts, robust and efficient communication between hosts is highly desirable.

SUMMARY OF THE INVENTION

A system and method for inter-process messaging using virtual circuits are provided. A plurality of virtual circuits, each including at least two network nodes, may be established over a single network connection. In one embodiment, a method for providing virtual circuits includes opening a network connection between a first computer system and a second computer system. The network connection may be opened by opening a first socket on the first computer system and a second socket on the second computer system. Sockets comprise connections to a network protocol such as TCP/IP. In one embodiment, the network connection may be opened asynchronously via a non-blocking open.

A first virtual circuit between two processes (e.g., a first process and a second process) may then be opened over the network connection. Likewise, a second virtual circuit between two different processes (e.g., a third process and a fourth process) may be opened over the same network connection. Additional virtual circuits may be opened as desired. The processes on the first computer system have access to the first socket for reading and writing data over the network connection, and the processes on the second computer system have similar access to the second socket.

A first message may be sent over the first virtual circuit from the first process to the second process. A second message may be sent over the second virtual circuit from the third process to the fourth process. In one embodiment, messages may be passed both to and from the first and second computer systems.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Figure 1:
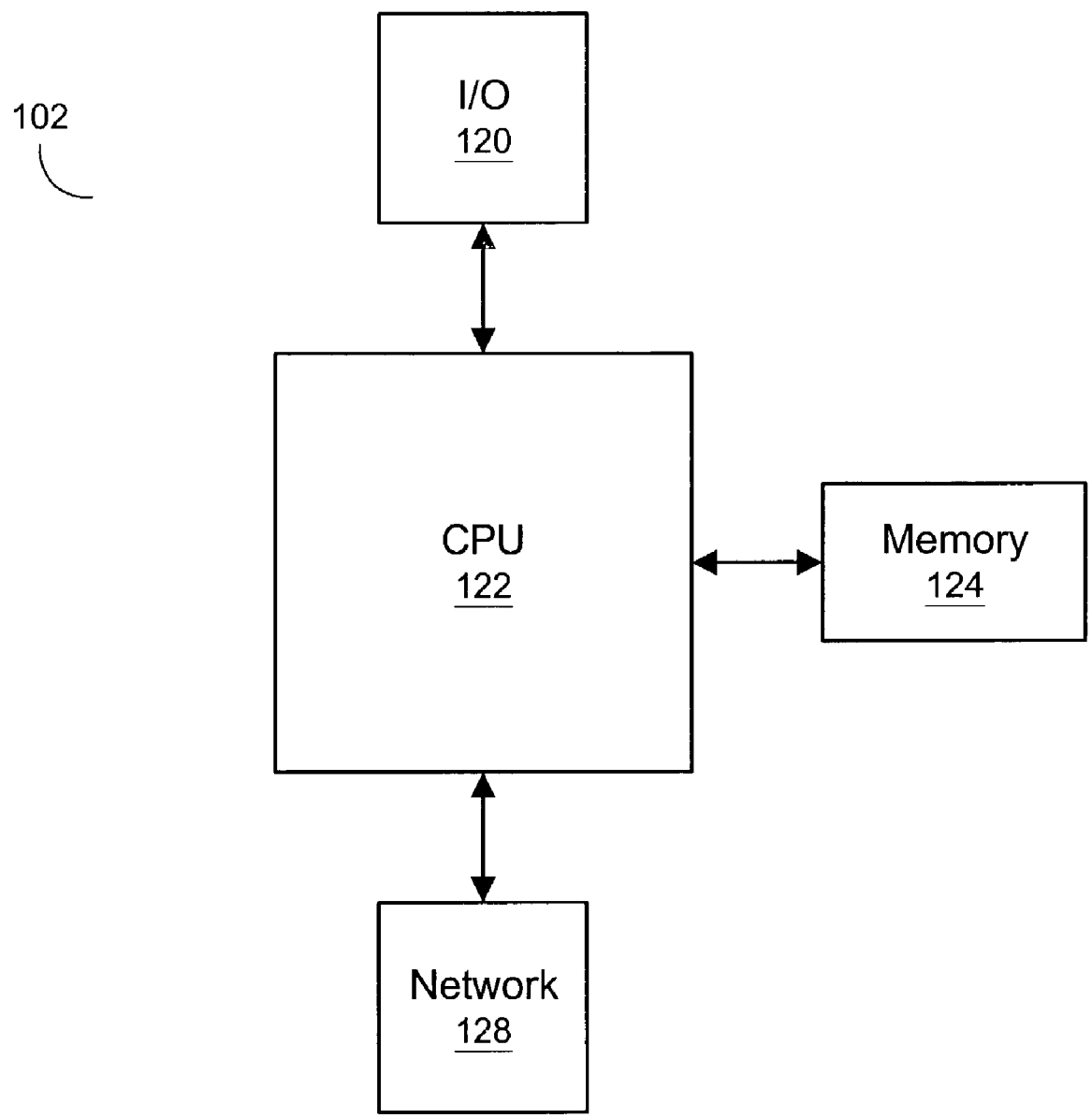
FIG. 1 is a block diagram of one embodiment of a computer system which implements a system and method for inter-process messaging as described herein.

FIG. 1 illustrates a computer system 102 which implements a system and method for inter-process messaging according to one embodiment. In various embodiments, the computer system 102 may comprise a desktop computer, a laptop computer, a palmtop computer, a network computer, a personal digital assistant (PDA), an embedded device, a smart phone, or any other suitable computing device. The computer system 102 includes at least one central processing unit (CPU) or other processor(s) 122. The CPU 122 is preferably coupled to a memory medium 124 which may store program instructions which implement the system and method for inter-process messaging as described herein. The CPU 122 is configured to execute the program instructions for inter-process messaging.

As used herein, the term "memory medium" includes a non-volatile medium, e.g., a magnetic medium, hard disk, or optical storage; a volatile medium, such as computer system memory, e.g., random access memory (RAM) such as DRAM, SDRAM, SRAM, EDO RAM, Rambus RAM, etc.; or an installation medium, such as CD-ROM, floppy disks, or a removable disk, on which computer programs are stored for loading into the computer system. The term "memory medium" may also include other types of memory. The memory medium 124 may therefore store program instructions and/or data which implement the system and method for inter-process messaging as described herein. Furthermore, the memory medium 124 may be utilized to install the program instructions and/or data. In a further embodiment, the memory medium 124 may be comprised in a second computer system which is coupled to the computer system 102 through a network 128. In this instance, the second computer system may operate to provide the program instructions stored in the memory medium 124 through the network 128 to the computer system 102 for execution.

The CPU 122 may also be coupled through an input/output bus 120 to one or more input/output devices that may include, but are not limited to, a display device such as a monitor, a pointing device such as a mouse, a keyboard, a track ball, a microphone, a touch-sensitive display, a magnetic or paper tape reader, a tablet, a stylus, a voice recognizer, a handwriting recognizer, a printer, a plotter, a scanner, and any other devices for input and/or output. The computer system 102 may acquire program instructions and/or data for implementing the system and method for inter-process messaging as described herein through the input/output bus 120.

The CPU 122 may include a network interface device 128 for coupling to a network. The network may be representative of various types of possible networks: for example, a local area network (LAN), wide area network (WAN), or the Internet. The system and method for inter-process messaging as described herein may therefore be implemented on a plurality of heterogeneous or homogeneous networked computer systems such as computer system 100 through one or more networks. Each computer system 100 may acquire program instructions and/or data for implementing the system and method for inter-process messaging as described herein over the network.

Figure 2:
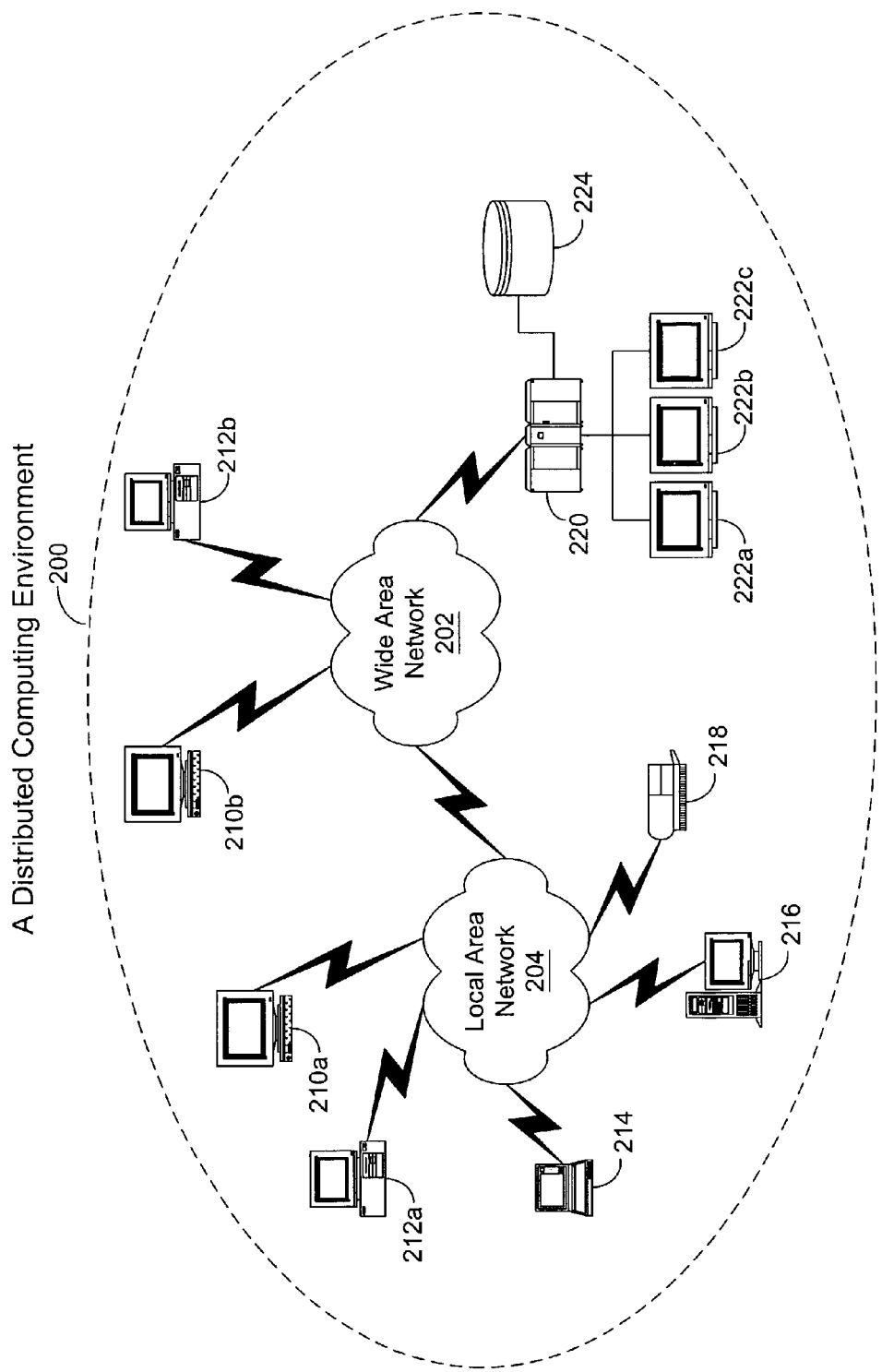
FIG. 2 is a block diagram illustrating a distributed computing environment which performs inter-process messaging according to one embodiment.

FIG. 2 is a block diagram illustrating a distributed computing environment which performs inter-process messaging according to one embodiment. An enterprise or distributed computing environment 200 may include a plurality of computer systems which are interconnected through one or more networks. Although one particular embodiment is shown in FIG. 2, the enterprise 200 may comprise a variety of heterogeneous computer systems and networks which are interconnected in a variety of ways and which run a variety of software applications and operating systems.

One or more local area networks (LANs) 204 may be included in the enterprise 200. A LAN 204 is a network that spans a relatively small area. Typically, a LAN 204 is confined to a single building or group of buildings. Each node (i.e., individual computer system or device) on a LAN 204 preferably has its own CPU with which it executes computer programs, and often each node is also able to access data and devices anywhere on the LAN 204. The LAN 204 thus allows many users to share devices (e.g., printers) as well as data stored on file servers. The LAN 204 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves). FIG. 2 illustrates an enterprise 200 including one LAN 204. However, the enterprise 200 may include a plurality of LANs 204 which are coupled to one another through a wide area network (WAN) 202. A WAN 202 is a network that spans a relatively large geographical area.

Each LAN 204 may include a plurality of interconnected computer systems or at least one computer system and at least one other device. Computer systems and devices which may be interconnected through the LAN 204 may include, for example, one or more of a workstation 210a, a personal computer 212a, a laptop or notebook computer system 214, a server computer system 216, or a network printer 218. An example LAN 204 illustrated in FIG. 2 includes one of each of these computer systems 210a, 212a, 214, and 216 and one printer 218. Each of the computer systems 210a, 212a, 214, and 216 is preferably an example of the typical computer system 102 as illustrated in FIG. 1. The LAN 204 may be coupled to other computer systems and/or other devices and/or other LANs 204 through a WAN 202.

A mainframe computer system or server computer system 220 may optionally be coupled to the enterprise 200. As shown in FIG. 2, the mainframe or server 220 is coupled to the enterprise 200 through the WAN 202, but alternatively the mainframe or server 220 may be coupled to the enterprise 200 through a LAN 204. As shown in FIG. 2, the mainframe 220 may be coupled to a storage device or file server 224 and mainframe terminals 222a, 222b, and 222c. The mainframe terminals 222a, 222b, and 222c access data stored in the storage device or file server 224 coupled to or comprised in the mainframe computer system 220.

The enterprise 200 may also include one or more computer systems which are connected to the enterprise 200 through the WAN 202: as illustrated, a workstation 210b and a personal computer 212b. In other words, the enterprise 200 may optionally include one or more computer systems which are not coupled to the enterprise 200 through a LAN 304. For example, the enterprise 200 may include computer systems which are geographically remote and connected to the enterprise 200 through the Internet.

As discussed above, the nodes in a distributed computer system may generate a large amount of inter-process message traffic from node to node. The normal overhead associated with such messaging may be reduced by the use of virtual circuits. A virtual circuit is a link between two or more network nodes (e.g., networked computer systems) that may be used for the sending and receiving of data between or among the network nodes. Through the use of virtual circuits, multiple processes may reduce networking overhead and reduce the number of low-level network connections by utilizing the same low-level network connection in a substantially concurrent manner. In one embodiment, a plurality of virtual circuits, each including at least two network nodes, may be established over a single network connection to achieve more efficient inter-process messaging.

Figure 3:
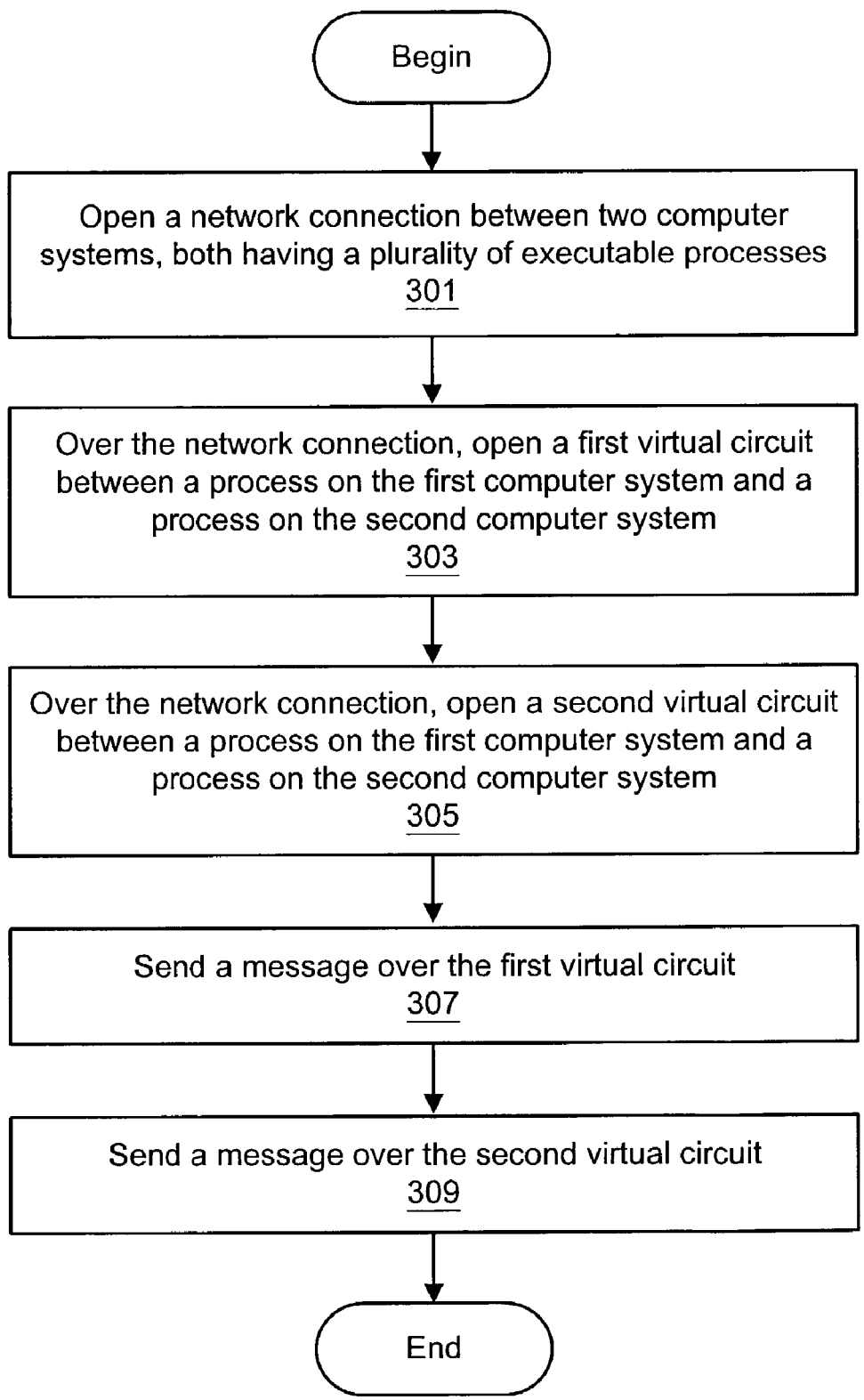
FIG. 3 is a flow diagram illustrating a method for inter-process messaging using virtual circuits according to one embodiment.

FIG. 3 is a flow diagram illustrating a method for inter-process messaging using virtual circuits according to one embodiment. In 301, a network connection following a particular network protocol may be opened between a first computer system and a second computer system. A network protocol is an agreed-upon format for transmitting data between two devices (such as two computer systems). The protocol may determine solutions to common networking issues including, but not limited to, the following: the type of error checking to be used; data compression method, if any; how the sending device will indicate that it has finished sending a message; and how the receiving device will indicate that it has received a message.

Standard protocols on UNIX systems and the Internet include TCP/IP (Transmission Control Protocol/Internet Protocol). TCP enables two hosts to establish a connection and exchange streams of data. TCP guarantees delivery of data and also guarantees that packets will be delivered in the same order in which they were sent. IP specifies the format of packets, also called datagrams, and the addressing scheme. Most networks combine IP with a higher-level protocol such as TCP to establish a connection between a destination and a source.

A packet is a piece of a message transmitted over a packet-switching network. One of the key features of a packet is that it contains the destination address in addition to the data. In packet-switching networks, messages are divided into packets before they are sent. Each packet is then transmitted individually and can even follow different routes to its destination. Once all the packets forming a message arrive at the destination, they may be recompiled into the original message. In contrast, normal telephone service is based on a circuit-switching technology, in which a dedicated line is allocated for transmission of "real-time" data between two parties. Packet switching is more efficient and robust for data that can withstand some delays in transmission, such as e-mail messages and web pages.

In one embodiment, the network connection may be opened by opening a first socket on the first computer system and a second socket on the second computer system. A socket is a piece of software that connects an application to a network protocol. In UNIX, for example, a program can send and receive TCP/IP messages by opening a socket and reading and writing data to and from the socket. Typically, the application need only worry about manipulating the socket and can rely on the operating system to actually transport messages across the network correctly.

In other embodiments, transport mechanisms other that TCP/IP sockets may be used.

In one embodiment, the network connection may be opened asynchronously via a non-blocking open. Rather than using a blocking wait with a pre-defined timeout (e.g., 0.5 seconds or 1 second), the connection may be opened with a delayed TCP bind operation. A callback routine may be used to alert the client when the binding is established or when a timeout occurs. These techniques may improve the efficiency of inter-process messaging by permitting clients to continue processing while an attempt is made to open a connection.

Both of the computer systems may have many processes or objects which are currently executing, and additional processes and objects may be initiated or instantiated. As used herein, the term "process" is equivalent to the terms "task," "program," and "object." Processes are said to be clients of a virtual circuit. In 303, a first virtual circuit between two processes (e.g., a first process and a second process) may then be opened over the network connection. Likewise, in 305 a second virtual circuit between two different processes (e.g., a third process and a fourth process) may be opened over the same network connection. The processes on the first computer system have access to the first socket for reading and writing data over the network connection, and the processes on the second computer system have similar access to the second socket. In one embodiment, a daemon or other process may be responsible for establishing and maintaining a virtual circuit with a corresponding daemon or process on the other node. The daemons may provide the client processes with various functions related to interprocess messaging using virtual circuits. In one embodiment, virtual circuits may offer filtering, sniffing, logging, redirecting, and other control/management of the message streams from outside the virtual circuit.

In 307, a first message may be sent over the first virtual circuit from the first process to the second process. In 309, a second message may be sent over the second virtual circuit from the third process to the fourth process. In one embodiment, messages may be passed both to and from the first and second computer systems.

Figure 4:
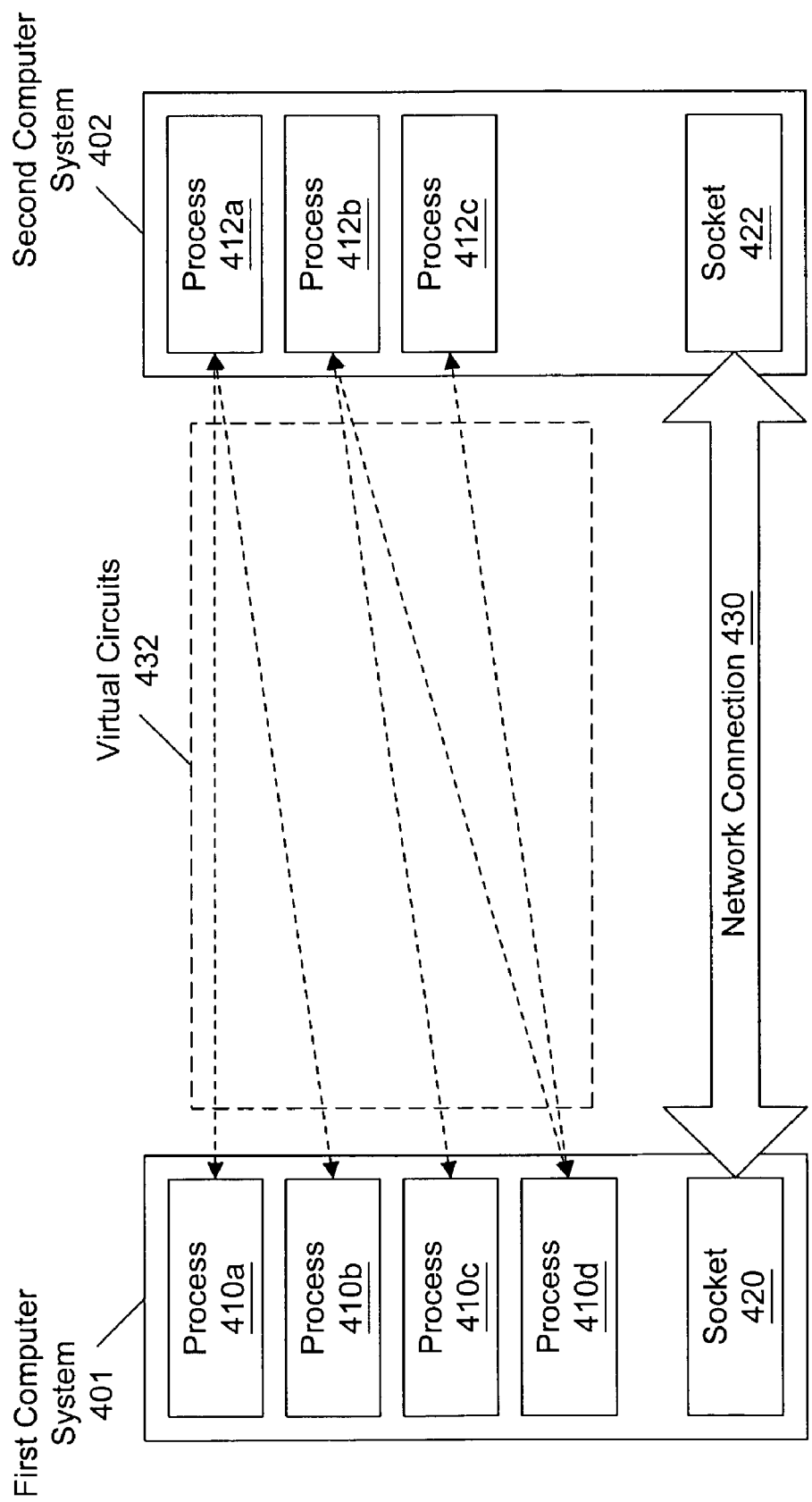
FIG. 4 is a diagram depicting a network connection including multiple virtual circuits according to one embodiment.

FIG. 4 is a diagram depicting a network connection including multiple virtual circuits according to one embodiment. The processes 410*a*, 410*b*, 410*c*, and 410*d* on the first computer system 401 have access to the first socket 420 for reading and writing data over the network connection 430, and the processes 412*a*, 412*b*, and 412*c* on the second computer system have similar access to the second socket 422. A virtual circuit may be maintained for each pair of client and server (i.e., each pair of nodes in communication with one another). In the example depicted in FIG. 4, the virtual circuits 432 include message paths between processes 410*a* and 412*a*, 410*b* and 412*a*, 410*c* and 412*b*, 410*d* and 412*b*, and 410*d* and 412*c*.

In one embodiment, virtual circuits may include more than two network nodes. The method of providing virtual circuits may include extending a virtual circuit to include another process on a third computer system. Another message may be sent over the extended virtual circuit to the process on the third computer system. These extended virtual circuits may be implemented in a star formation or a relay formation.

Figure 5:
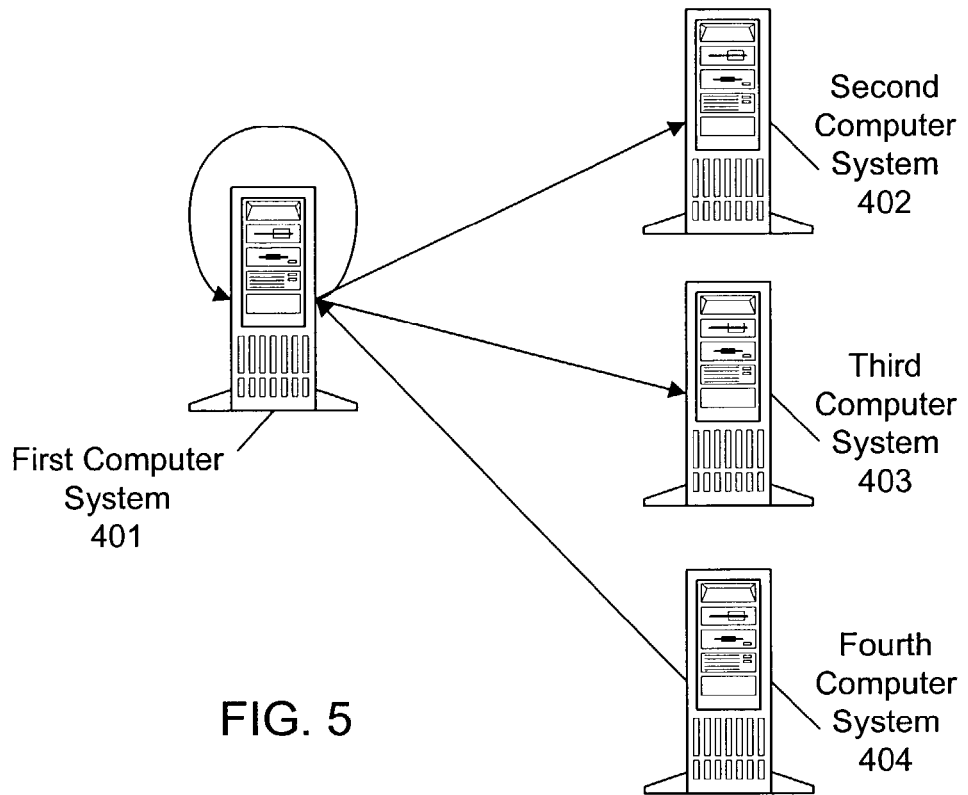
FIG. 5 is a diagram illustrating an extended virtual circuit in a star formation and including broadcast messaging according to one embodiment.

FIG. 5 is a diagram illustrating an extended virtual circuit in a star formation according to one embodiment. In the star formation, the virtual circuit includes multiple end-points 402, 403, and 404 and a single hub 401. The hub 401 is a special end-point that acts as a central junction for messages to the other end-points 402, 403, and 404. In one embodiment, network connections (e.g., using sockets) may be opened from the hub 401 to each of the end-points 402, 403, and 404.

In one embodiment, messages may be sent as unicast or broadcast messages. A unicast message is sent to a single recipient; a broadcast message is sent to multiple recipients (and, in some cases, to all possible recipients on the virtual circuit). FIG. 5 depicts a broadcast message sent by the fourth computer system 404 to the other computer systems 401, 402, and 403 in the virtual circuit. A unicast message sent from the fourth computer system 404 to another edge system 402 or 403 would use the hub system 401 as a junction. A junction is a message-forwarding handler that manages the immediate nodes and the physical connections to those nodes.

Figure 6:
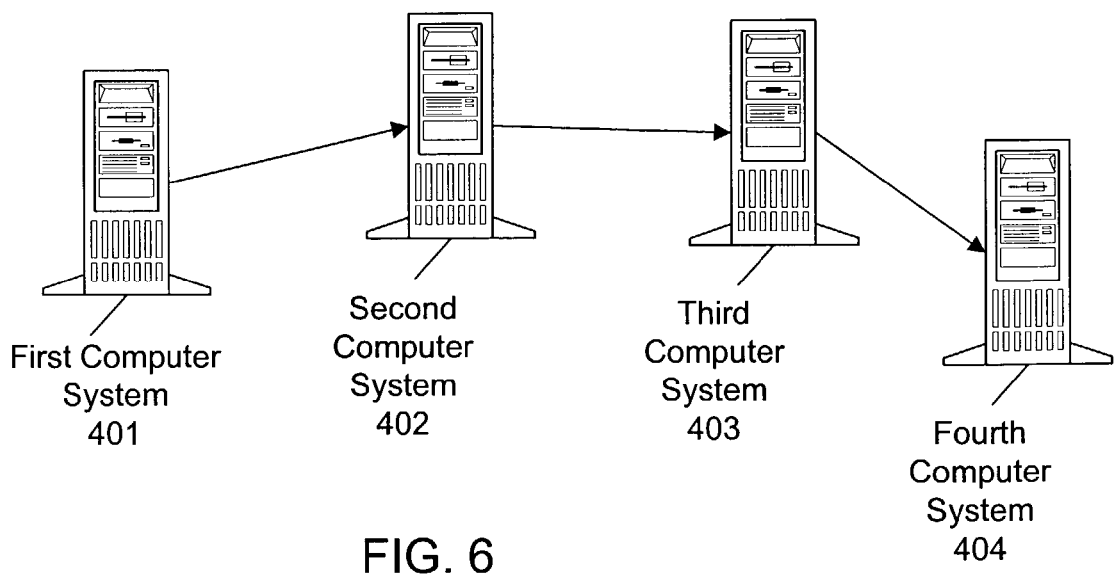
FIG. 6 is a diagram illustrating an extended virtual circuit in a relay formation according to one embodiment.

FIG. 6 is a diagram illustrating an extended virtual circuit in a relay formation according to one embodiment. In the relay formation, network nodes are strung together to create a virtual route from one to another. In other words, a relay connection includes two endpoints with one or more intermediate nodes in between the endpoints. A network connection (e.g., using sockets) may be opened from each node to the next node in the sequence. In the example shown in FIG. 6, the route goes from the first computer system 401 to the second computer system 402 to the third computer system 403 to the fourth computer system 404.

Figure 7:
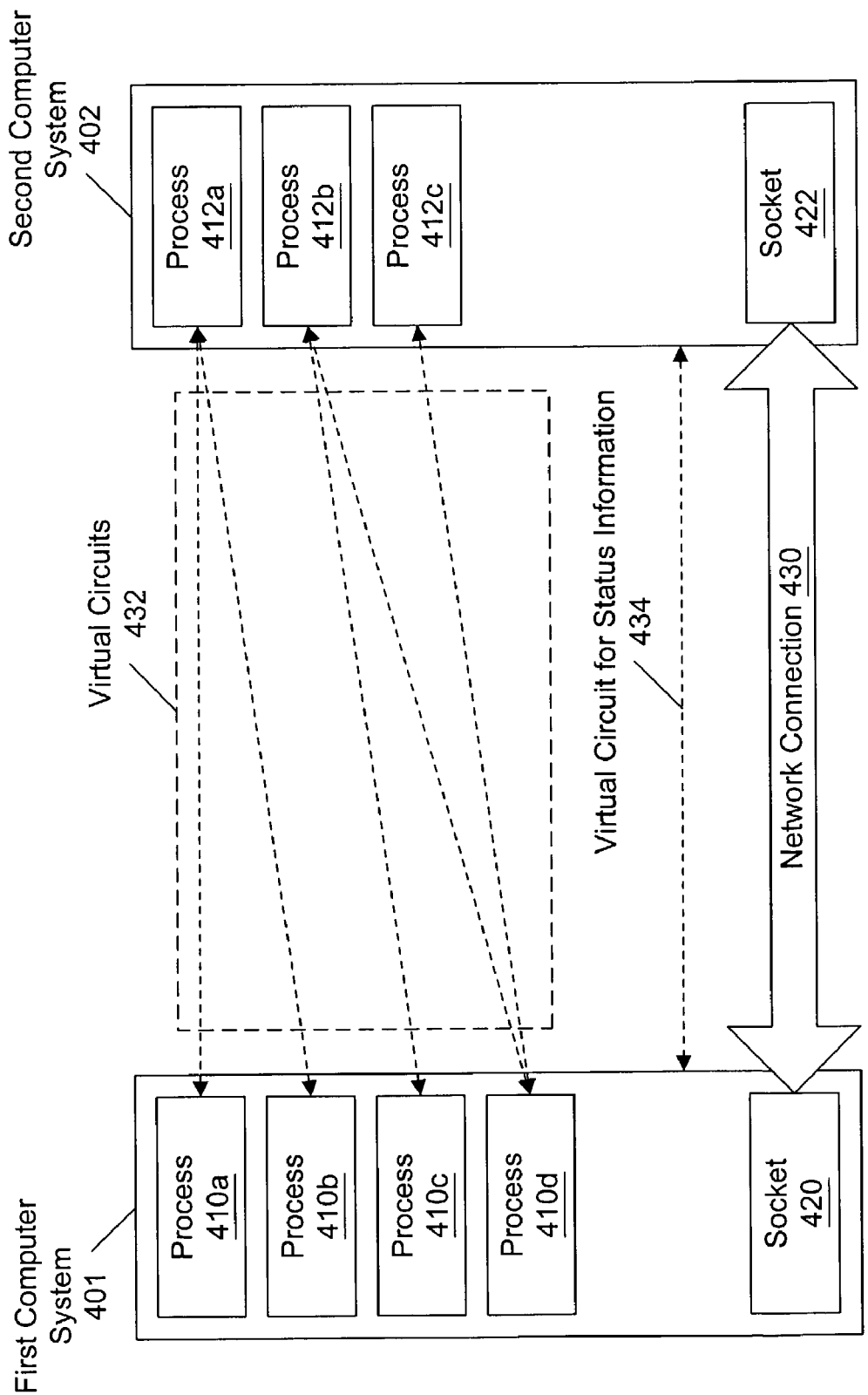
FIG. 7 is a diagram illustrating a network connection including a virtual circuit for status information according to one embodiment.

In one embodiment, an additional virtual circuit may be opened for the purpose of transmitting status information regarding the network connection between the networked computer systems. FIG. 7 is a diagram illustrating a network connection including a virtual circuit 434 for status information according to one embodiment. The status information may include a status or "heartbeat" of the network connection (e.g., whether a connection between two computer systems is "alive" or not). The status information may be used to detect FIN and RESET conditions on the link. When a disconnect is detected using the status information, callback routines may be used to alert clients (i.e., processes) of the virtual circuits. The virtual circuit 434 may also be used for other purposes, such as statistic sharing or clock synchronization among network nodes.

Often, the various network nodes have different system clocks and may even be in different time zones. Therefore, it may be desirable to calculate the clock differences between nodes. The status information transmitted in the virtual circuit 434 may include a current clock on the first computer system and/or a current clock on the second computer system. The difference between the clock on the first computer system and the clock on the second computer system may be calculated for clock synchronization purposes. A client process may therefore use the virtual circuit 434 to determine the clock-difference of another host, as relative to the local computer system.

Figure 8:
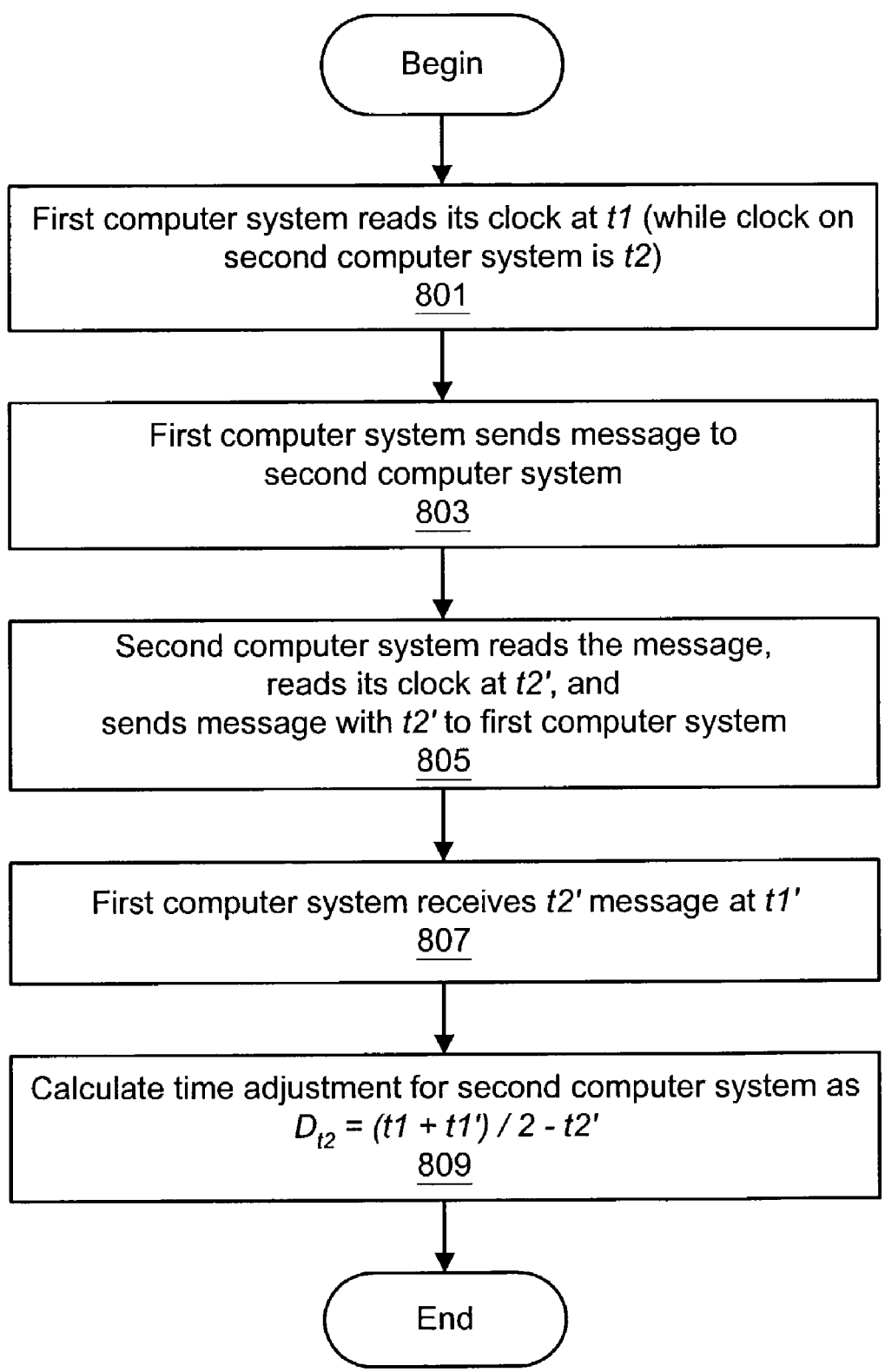
FIG. 8 is a flow diagram illustrating a method for clock synchronization using a virtual circuit according to one embodiment.

FIG. 8 is a flow diagram illustrating a method for clock synchronization using a virtual circuit according to one embodiment. It should be assumed that the network time is uniform, meaning that to-trip time is equal to from-trip time. Additionally, it should be assumed that the server process time is negligible. In 801, the first computer system reads its system clock and determines the time to be t1. At the same moment, the system clock on the second computer system is t2. In 803, the first computer system sends a message over the virtual circuit to the second computer system. In 805, in response to the message, the second computer system receives the message and reads its system clock at the time t2'. It then sends a message including the time t2' to the first computer system using the virtual circuit. The time at which the first computer receives the message (including t2') is noted as t1'. In 809, the time adjustment $D_{t2}$ between the two computer systems may be calculated as $D_{t2}=(t1+t1')/2-t2'$. This adjustment (an approximation of t1−t2) may be added to t2 to account for the difference in system clocks between the second and first computer systems.

In one embodiment, virtual circuits may be implemented using object-oriented programming techniques. The virtual circuit facility may provide several classes including, but not limited to: Vlist, a messaging protocol and carrier class; IPM, a connection management class; Junction, a multi-host connection management class which complements the base IPM functionalities.

VList stands for Variable-length Link List. In one embodiment, the VList is the container for the messages that are either transmitted over the network connection or passed among components within the daemon process. A VList may include a finite list of VElem objects. In one embodiment, each VElem holds a single word in the message. Each VElem may include the following fields: VELEM_TYPE (1 byte in length), VELEM_LEN (0 or 4 bytes in length), and VELEM_DATA (4 or VELEM_LEN bytes in length).

In one embodiment, there are three types of VElem objects: Header, String, and Integer. The Header type is a raw data array, in which the header is a special case with 48 bytes. The String type is a single byte or a multi-byte character array. The Integer type is a signed 32-bit quantity. In one embodiment, each VList starts with a header and then includes the strings and/or integers.

In one embodiment, the IPM (Inter-Process Messaging) class is the management class for socket-based communications. The IPM class may provide services like opening and closing sockets, listening for and caching incoming messages, and buffering and sending outgoing messages. The IPM class may also provide additional connection management functionalities such as heartbeat and detecting and handling unexpected socket closures. IPM may expect to send and receive messages in VList form. Each IPM object, called as an IPM handle, supports messaging multiplexing (i.e., multiple components on both ends of the connections can share the same IPM instance).

As the virtual circuit extends beyond the immediate host, the Junction class may help to join two or more dual-ended connections to form either a star-formed or relay-formed virtual circuit. From a message's perspective, when a message is destined to a remote host, Junction is used to forward the message to the ultimate destination(s) and also relay the return message back to the originator. A junction object keeps track of the sender and receiver via their corresponding IPM handles. In addition, the junction may also handle situations like connection loss. In one embodiment, Junction can handle IPM handles with multiplexing usage.

In one embodiment, public access functions for IPM virtual circuits may be provided. To monitor if there are new connections, any departing nodes, or if any new messages have arrived, the virtual circuit may provide the following IpmHandle::events( ) function for the main loop:

static void IpmHandle::events (DList handle_listpp, DList vlist_listpp, s32 timeout);

The caller is responsible for maintaining both lists (handle_listpp and vlist_listpp) by properly instantiating them before calling the function and delete both lists afterward. By doing so, the program code that handles all closed handles will no longer be needed in the main loop. If a returned list is empty, the user should simply go on to the next task.

The following function may be provided to obtain an IPM handle:

static IpmHandle* IpmHandle::getIpmHandle (VxCHAR *hostp, s32 async=FALSE);

The function may require the hostname of the remote server and an optional flag for asynchronous open if a new IPM handle is required. If successful, the function may return the reference to an IPM handle, whether it was created by the function or whether it already existed. In the former case, the function may attempt to open the IPM handle as well. If the function fails, a NULL pointer will be returned, and the error code will be set. Alternatively, an overload function using an IP address may be provided:

static IpmHandle* IpmHandle::getIpmHandle (struct in_addr *addr, s32 async=FALSE);

Once an IPM handle is acquired, the client object should immediately register itself to the IPM handle by using one of the following two functions:

static IpmHandle* IpmHandle::regHandle (IpmHandle
*handlep, void *myself, void (*func)(IpmHandle*, void
*, s32)=NULL);
static IpmHandle* IpmHandle::regHandle (s32 handle_id,
void *myself, void (*func)(IpmHandle*, void *, s32)
=NULL);

In either case, a callback function is optional but highly desirable. The callback function may be called when the IPM handle is closed forcefully. However, it is desirable that the callback function should be short and contain no recursive code, because the callback function is generally called out of the sequence of the normal state machine. A callback function may require three arguments: IpmHandle* as a pointer to the IPM handle; void* as a pointer to the registered object; and s32 as a callback event type (e.g., an IPM error code). Both functions may return the reference to the IPM handle, or NULL when not found.

Once an object stops using the IpmHandle, it should unregister the IpmHandle using either of the following two functions:

static s32 IpmHandle::unregHandle (IpmHandle *handlep, void *myself);
static s32 IpmHandle::unregHandle (s32 handle_id, void *myself);

Both functions should return either 1 (indicating that the IPM handle was found and unregistration is complete) or 0 (indicating that no such IPM handle can be found).

In one embodiment, additional functions for IPM virtual circuits may be provided for internal management operations (e.g., by the processes utilizing a particular virtual circuit). For example, to mitigate the potential delays of a synchronous (blocking) open, the function of opening an IPM handle may have an option to be called asynchronously. The a sync option will open the handle while trying to test the connection at each events( ) until either successful or timeout. Upon success or failure, the IPM handle may call the callback functions provided by each of the registered objects.

Any disconnected IPM handles may be deleted by the events( ) call mentioned previously. For closing connected handles, the main process is no long responsible. Instead, each object may unregister from the IPM handle, and IpmHandle::events( ) may attempt to remove any unused IPM handles (i.e., when there are no client objects registered for a particular IPM handle). However, to ensure the delivery of delayed messages, each IPM handle that doesn't have registered objects may linger for a certain amount time before being deleted.

Heartbeat and timeout detection may be included within the IPM handle class. In one embodiment, each IPM handle has three private variables: time_t_last_time, initially set to the current time; time_t_countdown, initially set to a maximum value (heartbeat interval); and time_t_timeout, initially set to a maximum value (total timeout before disconnect); Those values are initiated at the time when open flag is set to 1. Each event( ) call obtains the current time, which will be subtracted by _last_time to generate a delta, which is used to subtract_countdown and _timeout as well as update _last_time with the current time value. Whenever there is an incoming message on the IPM handle, the IPM handle may reset the value of both _countdown and _timeout to the initial values respectively. When the _timeout reaches zero or below, the IPM handle is considered to be disconnected. The handle will be closed and deleted. When the _countdown reaches zero or below, an IpmPing message will be sent to the handle, and the _countdown value will be reset to its initial value.

On the receiving side, once an IpmPing message is received, the handle will reply with a Ping_Ack message immediately, and both _countdown and _timeout values will be re-initialized. The heartbeat may only be activated on IPM handles that are active. Any handles that are lingering for an imminent close may disable the heartbeat activities.

Figure 9:
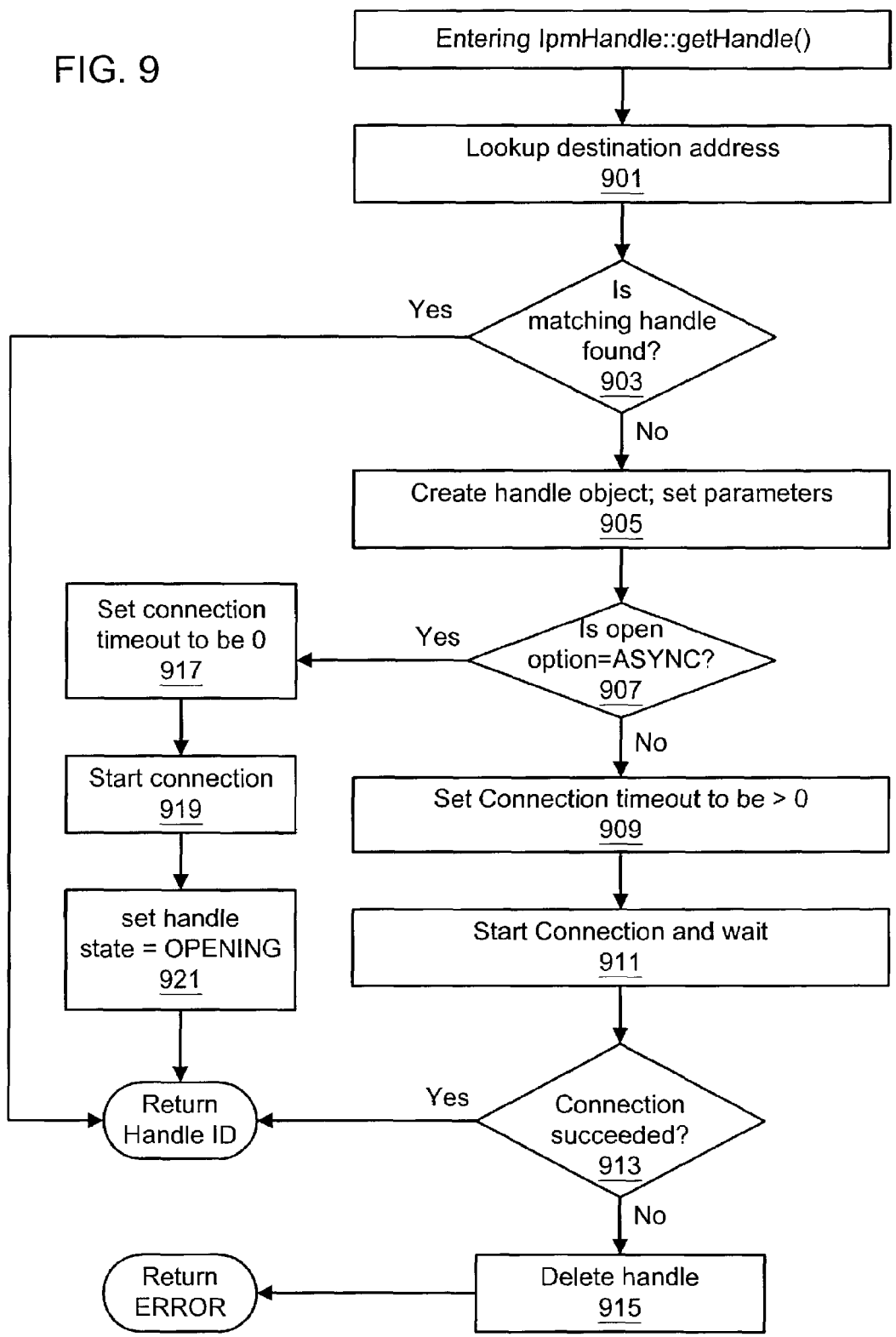
FIG. 9 is a flow diagram illustrating a method for obtaining an IPM handle according to one embodiment.

FIG. 9 is a flow diagram illustrating a method for obtaining an IPM handle according to one embodiment. In 901, the destination address for the IPM handle may be looked up. If a matching IPM handle is found in 903, then the Handle ID is returned. Otherwise, the IPM handle object is instantiated and its parameters are set in 905. In 907, it may be determined whether the opening is to be performed asynchronously. If so, then set the connection timeout to zero in 917, start the connection in 919, set the handle state to "OPENING" in 921, and return the IPM handle ID. Otherwise, the connection timeout may be set to a value greater than zero in 909. The connection should be initiated, and the getHandle( ) process may wait for a result. If the connection succeeds in 913, then return the IPM handle ID. If the connection opening is unsuccessful, then delete the IPM handle in 915 and return an error code.

Figure 10:
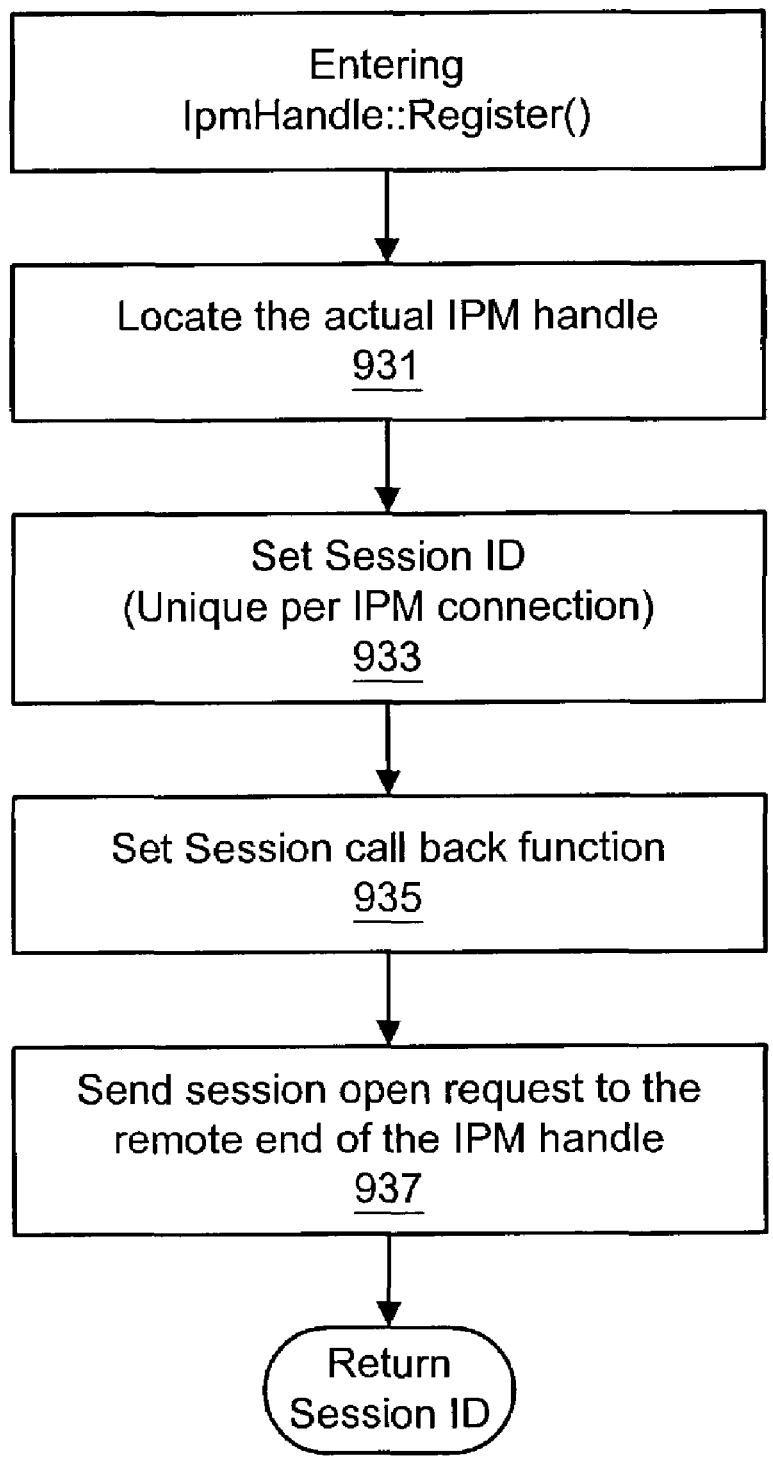
FIG. 10 is a flow diagram illustrating a method for registering use of an IPM handle according to one embodiment.

FIG. 10 is a flow diagram illustrating a method for registering use of an IPM handle according to one embodiment. In 931, the actual IPM handle should be searched for. In 933, the session ID may be set. In 935, the session callback function may be set. In 937, the session open request may be sent to the remote end of the IPM handle before the session ID is returned.

Figure 11A:
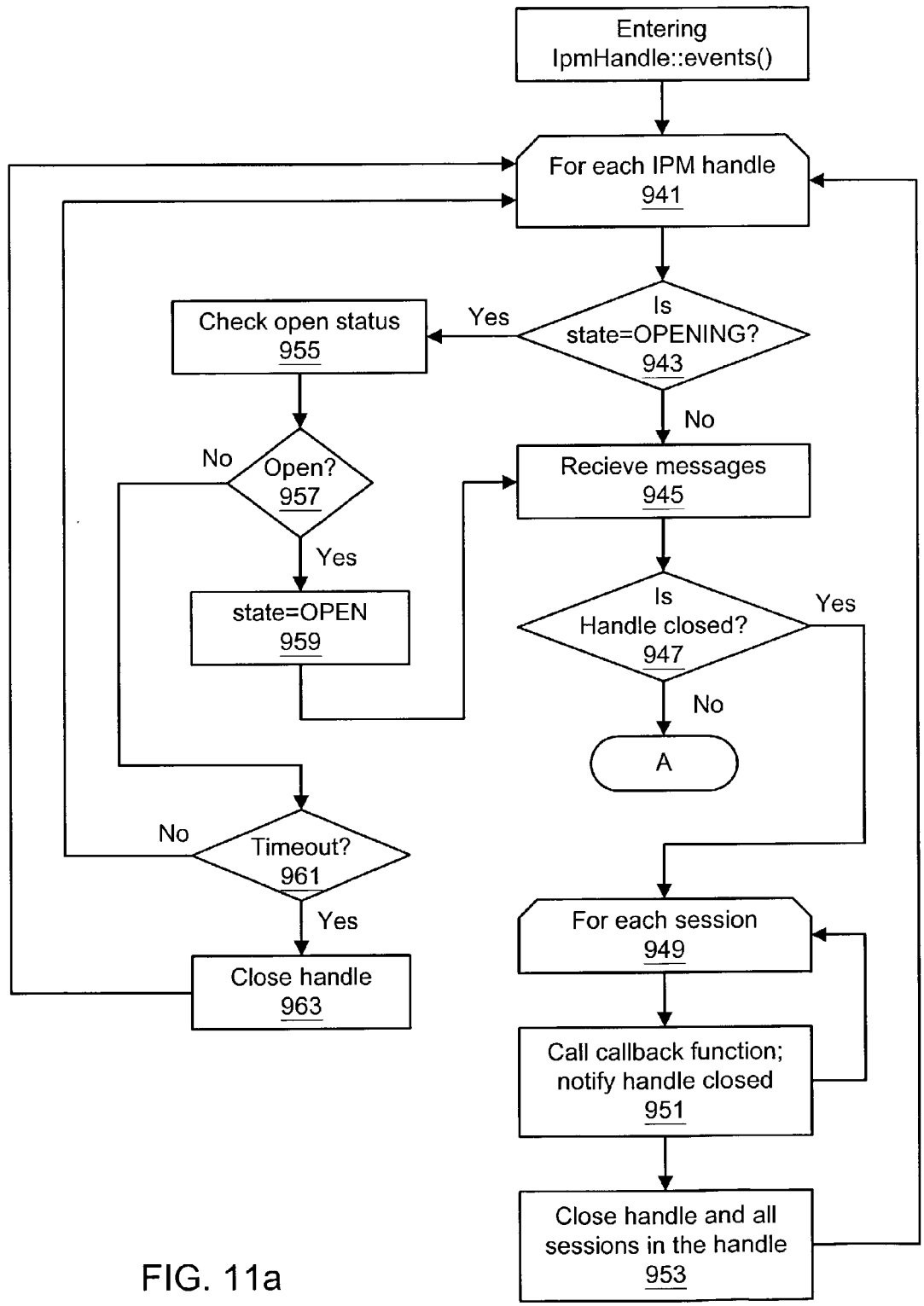
FIGS. 11a and 11b are flow diagrams illustrating a method for an IPM handle event loop according to one embodiment.
Figure 11B:
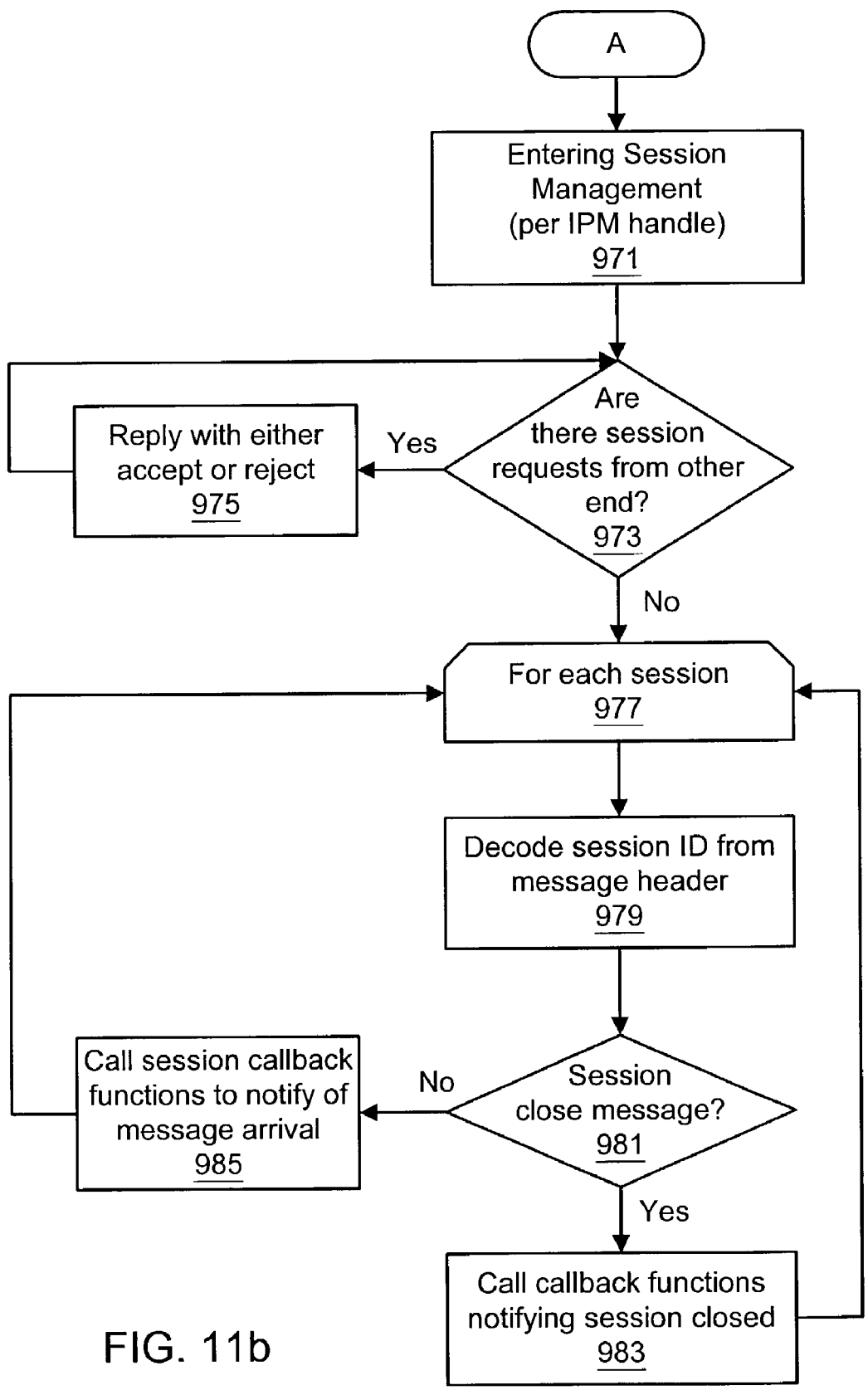

FIGS. 11a and 11b are flow diagrams illustrating a method for an IPM handle event loop according to one embodiment. In 941, enter a loop to perform steps for each IPM handle. In 943, if it is determined that the state of the IPM handle is "OPENING," then check the open status in 955. If it is determined in 957 that the IPM handle is now open, then set the state to "OPEN" in 959. Otherwise, the timeout status may be determined in 961. If the connection attempt has not timed out, then return to the beginning of the loop in 941. If a timeout has occurred, then close the handle in 963 and return to the loop beginning in 941.

Messages from another node in the virtual circuit may then be received in 945. If the IPM handle is determined to be closed in 947, the enter a loop in 949 to perform steps for each session. In 951, call the callback function for each session to notify that the handle has been closed. In 953, close the handle and all the sessions in the handle before returning to the beginning of the event loop in 941.

If the handle is not closed, then enter a session management phase for each IPM handle in 971. In 973, if it is determined that there are session requests from the other end of the virtual circuit, then reply with acceptance or rejection in 975. If there are no session requests, then in 977 enter a loop to perform steps for each session. In 979, the session ID from the message header may be decoded. If it is determined that the session is to be closed in 981, then call the appropriate callback function(s) to notify of the session closing in 981. Otherwise, call the appropriate callback function(s) to notify of the message arrival in 985.

Various embodiments may further include receiving, sending or storing instructions and/or data that implement the database snapshot functionality in accordance with the foregoing description upon a computer readable medium. Generally speaking, a computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method for providing virtual circuits for inter-process messaging, wherein the method comprises:

opening a network connection between a first computer system and a second computer system by opening a first socket on the first computer system and a second socket on the second computer system, wherein the first and second sockets comprise connections to a network protocol;

opening a first virtual circuit over the network connection between a first process and a second process, wherein the first process comprises a first application having write access for the first socket, and wherein the second process comprises a second application having read access for the second socket;

opening a second virtual circuit over the network connection between a third process and a fourth process, wherein the third process comprises a third application having write access for the first socket, and wherein the fourth process comprises a fourth application having read access for the second socket;

sending a first message over the first virtual circuit from the first process to the second process;

sending a second message over the second virtual circuit from the third process to the fourth process.

2. The method for providing virtual circuits for inter-process messaging as recited in claim 1, further comprising:

extending the first virtual circuit to include a fifth process on a third computer system;

sending a third message over the first virtual circuit to the fifth process on the third computer system.

3. The method for providing virtual circuits for inter-process messaging as recited in claim 2, wherein the first virtual circuit is implemented in a star formation.

4. The method for providing virtual circuits for inter-process messaging as recited in claim 2, wherein the first virtual circuit is implemented in a relay formation.

5. The method for providing virtual circuits for inter-process messaging as recited in claim 2, further comprising sending the third message as a unicast message.

6. The method for providing virtual circuits for inter-process messaging as recited in claim 2, further comprising sending the third message as a broadcast message.

7. The method for providing virtual circuits for inter-process messaging as recited in claim 1, wherein the network connection is opened asynchronously.

8. The method for providing virtual circuits for inter-process messaging as recited in claim 1, further comprising calculating a difference between a clock on the first computer system and a clock on the second computer system for clock synchronization.

9. The method for providing virtual circuits for inter-process messaging as recited in claim 1, further comprising opening a third virtual circuit for transmitting status information regarding the network connection between the first computer system and the second computer system.

10. The method for providing virtual circuits for inter-process messaging as recited in claim 9, wherein the status information comprises a current clock on the first computer system and a current clock on the second computer system.

11. The method for providing virtual circuits for inter-process messaging as recited in claim 9, wherein the status information comprises a status of the network connection.

12. A computer system comprising:

one or more microprocessors;

a memory coupled to the one or more microprocessors, the memory including program instructions executable to implement a method of:

opening a network connection between a first computer system and a second computer system by opening a first socket on the first computer system and a second socket on the second computer system, wherein the first and second sockets comprise connections to a network protocol;

opening a first virtual circuit over the network connection between a first process and a second process, wherein the first process comprises a first application having write access for the first socket, and wherein the second process comprises a second application having read access for the second socket;

opening a second virtual circuit over the network connection between a third process and a fourth process, wherein the third process comprises a third application having write access for the first socket, and wherein the fourth process comprises a fourth application having read access for the second socket;

sending a first message over the first virtual circuit from the first process to the second process;

sending a second message over the second virtual circuit from the third process to the fourth process.

13. The computer system as recited in claim 12, wherein the method further comprises:

extending the first virtual circuit to include a fifth process on a third computer system;

sending a third message over the first virtual circuit to the fifth process on the third computer system.

14. The computer system as recited in claim 12, wherein the network connection is opened asynchronously.

15. The computer system as recited in claim 12, wherein the method further comprises calculating a difference between a clock on the first computer system and a clock on the second computer system for clock synchronization.

16. The computer system as recited in claim 12, wherein the method further comprises opening a third virtual circuit for transmitting status information regarding the network connection between the first computer system and the second computer system.

17. A computer readable storage medium including program instructions executable to implement a method of:

opening a network connection between a first computer system and a second computer system by opening a first socket on the first computer system and a second socket on the second computer system, wherein the first and second sockets comprise connections to a network protocol;

opening a first virtual circuit over the network connection between a first process and a second process, wherein the first process comprises a first application having write access for the first socket, and wherein the second process comprises a second application having read access for the second socket;

opening a second virtual circuit over the network connection between a third process and a fourth process, wherein the third process comprises a third application having write access for the first socket, and wherein the fourth process comprises a fourth application having read access for the second socket;

sending a first message over the first virtual circuit from the first process to the second process;

sending a second message over the second virtual circuit from the third process to the fourth process.

18. The computer readable storage medium as recited in claim 17 wherein the method further comprises:

extending the first virtual circuit to include a fifth process on a third computer system;

sending a third message over the first virtual circuit to the fifth process on the third computer system.

19. The computer readable storage medium as recited in claim 17, wherein the network connection is opened asynchronously.

20. The computer readable storage medium as recited in claim 17, wherein the method further comprises calculating a difference between a clock on the first computer system and a clock on the second computer system for clock synchronization.

21. The computer readable storage medium as recited in claim 17, wherein the method further comprises opening a third virtual circuit for transmitting status information regarding the network connection between the first computer system and the second computer system.

22. The computer readable storage medium as recited in claim 17, wherein the status information comprises a current clock on the first computer system and a current clock on the second computer system.

23. The computer readable storage medium as recited in claim 22, wherein the status information comprises a status of the network connection.

24. A system for providing virtual circuits for inter-process messaging, wherein the system comprises:

means for opening a network connection between a first computer system and a second computer system by opening a first socket on the first computer system and a second socket on the second computer system, wherein the first and second sockets comprise connections to a network protocol;

means for opening a first virtual circuit over the network connection between a first process and a second process, wherein the first process comprises a first application having write access for the first socket, and wherein the second process comprises a second application having read access for the second socket;

means for opening a second virtual circuit over the network connection between a third process and a fourth process, wherein the third process comprises a third application having write access for the first socket, and wherein the fourth process comprises a fourth application having read access for the second socket;

means for sending a first message over the first virtual circuit from the first process to the second process;

means for sending a second message over the second virtual circuit from the third process to the fourth process.

* * * * *